US012633209B2

(12) United States Patent
Bailey-Moore et al.

(10) Patent No.: US 12,633,209 B2
(45) Date of Patent: May 19, 2026

(54) PERSONAL TRACKING AND ALERT DEVICE

(71) Applicants: La Frances Bailey-Moore, Alexandria, VA (US); Maurice Moore, Alexandria, VA (US)

(72) Inventors: La Frances Bailey-Moore, Alexandria, VA (US); Maurice Moore, Alexandria, VA (US)

( * ) Notice: Subject to any disclaimer, the term of this patent is extended or adjusted under 35 U.S.C. 154(b) by 15 days.

(21) Appl. No.: 18/794,495

(22) Filed: Aug. 5, 2024

(65) Prior Publication Data

US 2026/0038359 A1 Feb. 5, 2026

(51) Int. Cl.
*G08B 27/00* (2006.01)
*A44B 11/00* (2006.01)
*G08B 21/04* (2006.01)

(52) U.S. Cl.
CPC .......... *G08B 27/006* (2013.01); *A44B 11/005* (2013.01); *G08B 21/0423* (2013.01)

(58) Field of Classification Search
CPC ..... G06Q 20/321; A61B 5/681; A61B 5/1118; H04B 1/0343; A44C 5/0007; G08B 21/0423
See application file for complete search history.

(56) References Cited

U.S. PATENT DOCUMENTS 4,300,129 A 11/1981 Cataldo
7,271,717 B1 9/2007 Amos
D647,279 S 10/2011 Shi
10,417,893 B2 * 9/2019 Myers .................. A61B 5/0004
11,439,207 B2 9/2022 Fan
2004/0224720 A1 11/2004 Sun
2016/0088135 A1 * 3/2016 Gesing ................. H04B 1/0343 455/556.1
2016/0203701 A1 * 7/2016 Woodard ............... G08B 21/02 340/573.1
2019/0008463 A1 * 1/2019 Xing ...................... G16H 10/40
2022/0047454 A1 2/2022 Nazemoff
2022/0301415 A1 * 9/2022 Reynolds ........... G08B 21/0288

FOREIGN PATENT DOCUMENTS

WO WO2018032905 2/2018

* cited by examiner

*Primary Examiner* — Mirza F Alam

(57) ABSTRACT

A personal tracking and alert device includes a personal electronic device that is carried by a user. The personal electronic device is in wireless communication with personal contacts of the user. A waist belt is provided which can be worn around a waist of the user and a communication unit is integrated into the waist belt. The communication unit is in wireless communication with the personal electronic device. The communication unit is actuatable into a first condition to broadcast a help command to personal contacts of the user thereby alerting the personal contacts of the user that the user is in need of assistance. The communication unit is actuatable into a second condition to broadcast the physical location of the waist belt to the personal contacts of the user thereby enabling the personal contacts of the user to track the physical location of the waist belt to locate the user.

7 Claims, 5 Drawing Sheets

PERSONAL TRACKING AND ALERT DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to tracking and alert devices and more particularly pertains to a new tracking and alert devices for alerting personal contacts of a user that the user needs help and/or broadcasting the physical location of the user to the personal contacts to enable the personal contacts to track the user. The device includes a personal electronic device carried by the user and a waist belt that is worn on the user's waist. The device includes a communication unit that is integrated into the waist belt and which is in wireless communication with the personal electronic device. The communication unit is actuatable in to a first condition to broadcast an alert to personal contacts of the user to request assistance from the personal contacts. The communication unit actuatable into a second condition to broadcast the physical location of the waist belt, determined by a global positioning system, to enable the personal contacts of the user to track the location of the user.

(2) Description of Related Art Including Information Disclosed Under 37 CFR 1.97 and 1.98

The prior art relates to tracking and alert devices including personal alert device that includes a waist belt buckle and a communication unit integrated into the waist belt that is actuated when the user distends their waist to broadcast an alert signal and a smart belt device that includes a waist belt and a global positioning device integrated into a buckle of the waist belt and a direction indicating element rotatably integrated into the buckle for displaying the direction of travel or a user and a wrist watch alert device that includes a wrist watch and a communication unit integrated into the wrist watch which can be actuated to broadcast an alert signal to request help for a user and a variety of bracelet alert devices that each at least includes a bracelet that is worn on a wrist of a user which can each at least be actuated to emit an alert signal and a shoelace tracking device that includes a waist belt and a bracelet and a shoelace and a plurality of tracking units each integrated into a respective waist belt and bracelet and shoelace which is each in wireless communication with a personal electronic device for broadcasting the physical location of a user, determined by a global positioning system to a caregiver. In no instance does the prior art disclose a personal tracking and alert device that includes a waist belt and a communication unit which can be actuated to initiate a personal electronic device of the user to contact personal contacts of the user for assistance and or to broadcast the physical location of the user, determined by a global positioning system, to the personal contacts to enable the personal contacts to track the location of the user.

BRIEF SUMMARY OF THE INVENTION

An embodiment of the disclosure meets the needs presented above by generally comprising a personal electronic device that is carried by a user. The personal electronic device is in wireless communication with personal contacts of the user. A waist belt is provided which can be worn around a waist of the user and a communication unit is integrated into the waist belt. The communication unit is in wireless communication with the personal electronic device. The communication unit is actuatable into a first condition to broadcast a help command to personal contacts of the user thereby alerting the personal contacts of the user that the user is in need of assistance. The communication unit is actuatable into a second condition to broadcasts the physical location of the waist belt to the personal contacts of the user thereby enabling the personal contacts of the user to track the physical location of the waist belt to locate the user.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
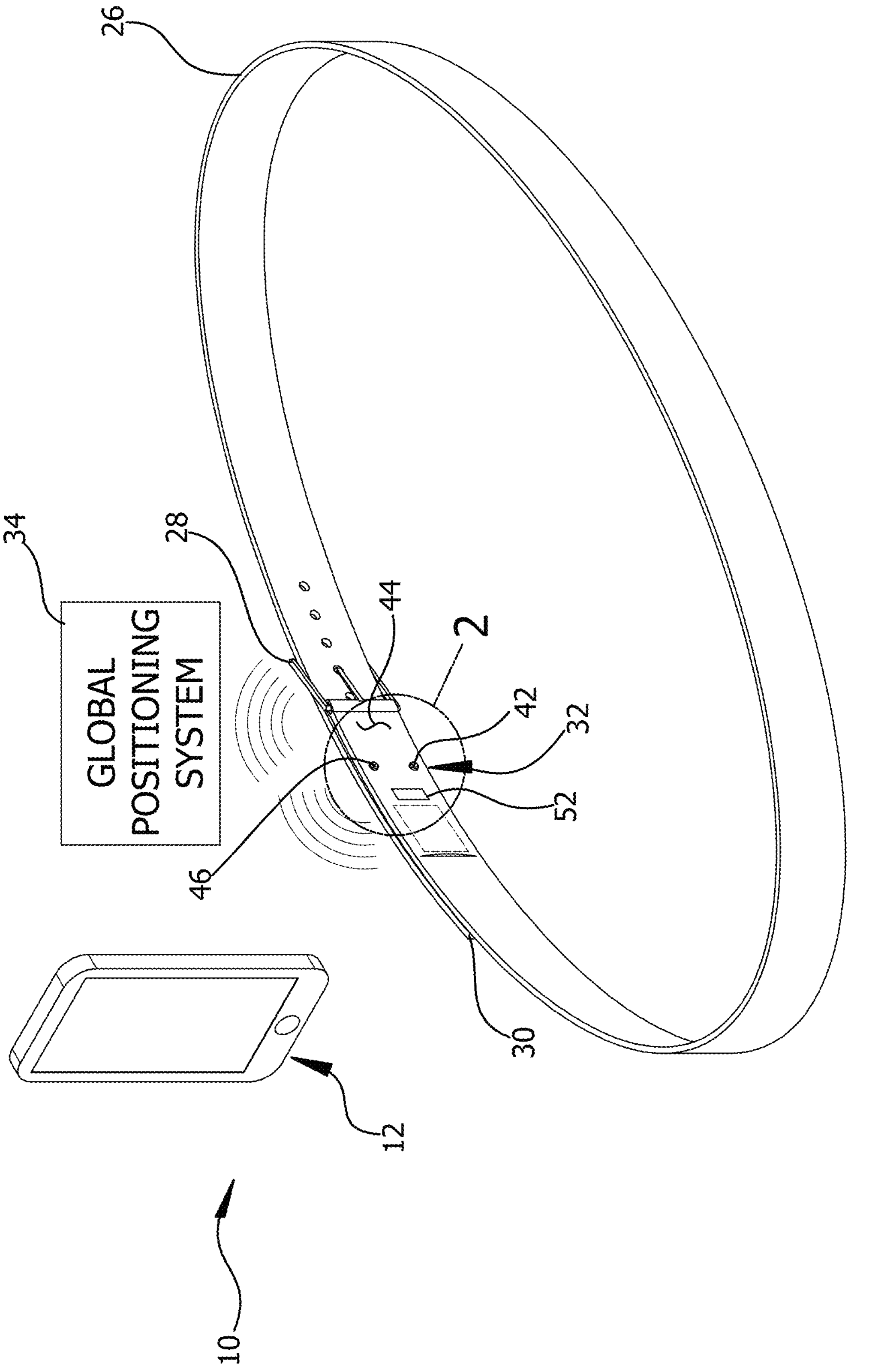
FIG. 1 is a perspective view of a personal tracking and alert device according to an embodiment of the disclosure.
Figure 2:
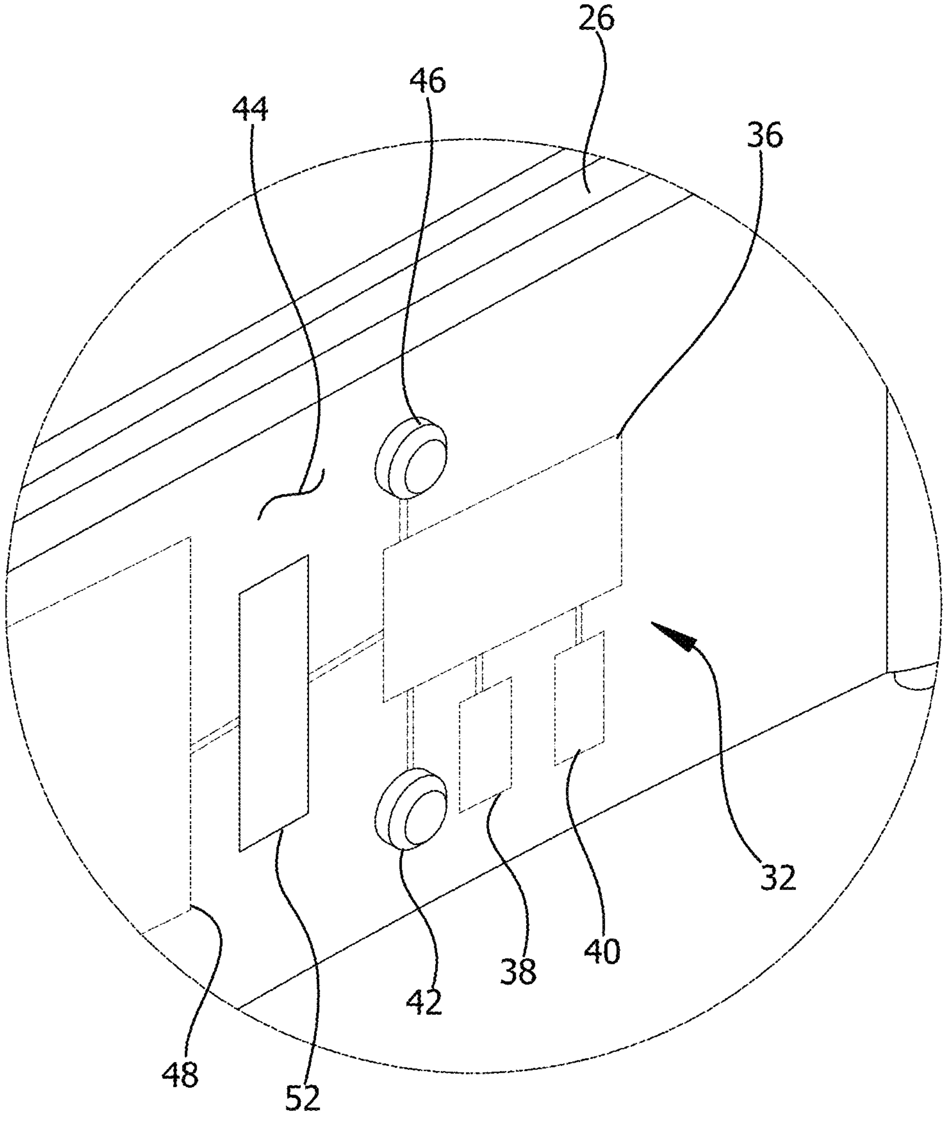
FIG. 2 is a phantom perspective view taken from circle 2 of FIG. 1 of an embodiment of the disclosure.
Figure 3:
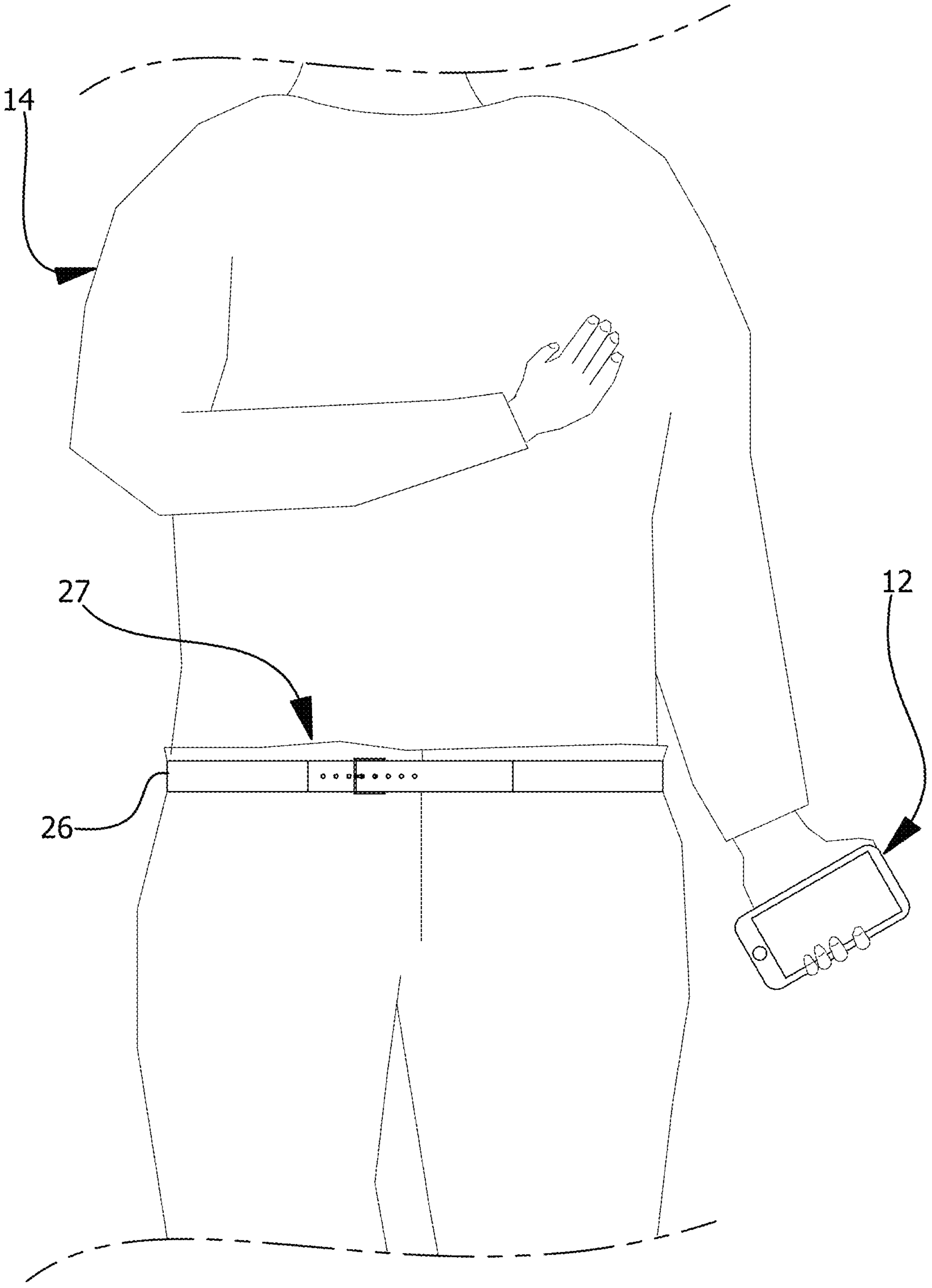
FIG. 3 is a perspective in-use view of an embodiment of the disclosure.
Figure 4:
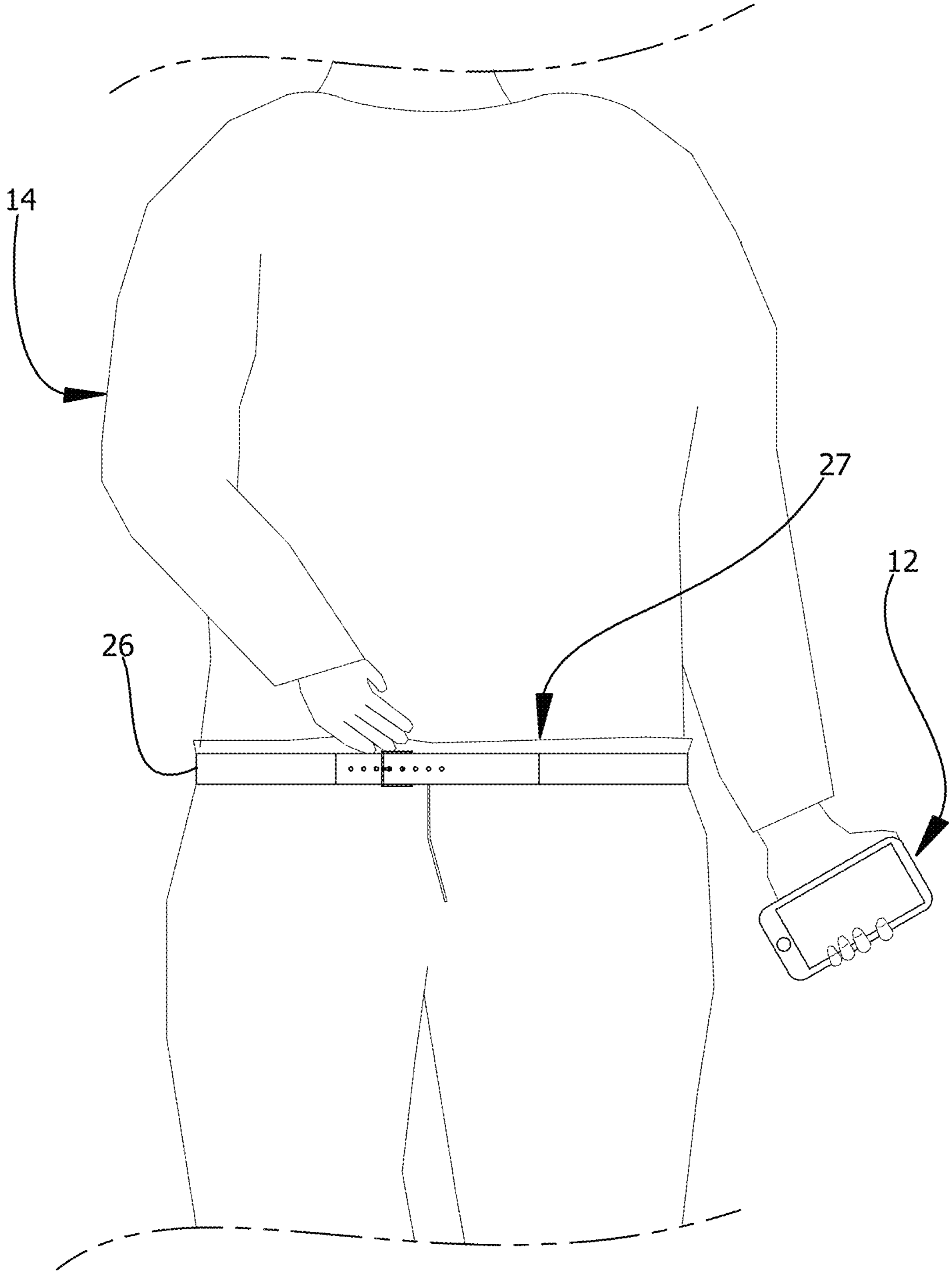
FIG. 4 is a perspective in-use view of an embodiment of the disclosure showing a user actuating a communication unit integrated into a waist belt.
Figure 5:
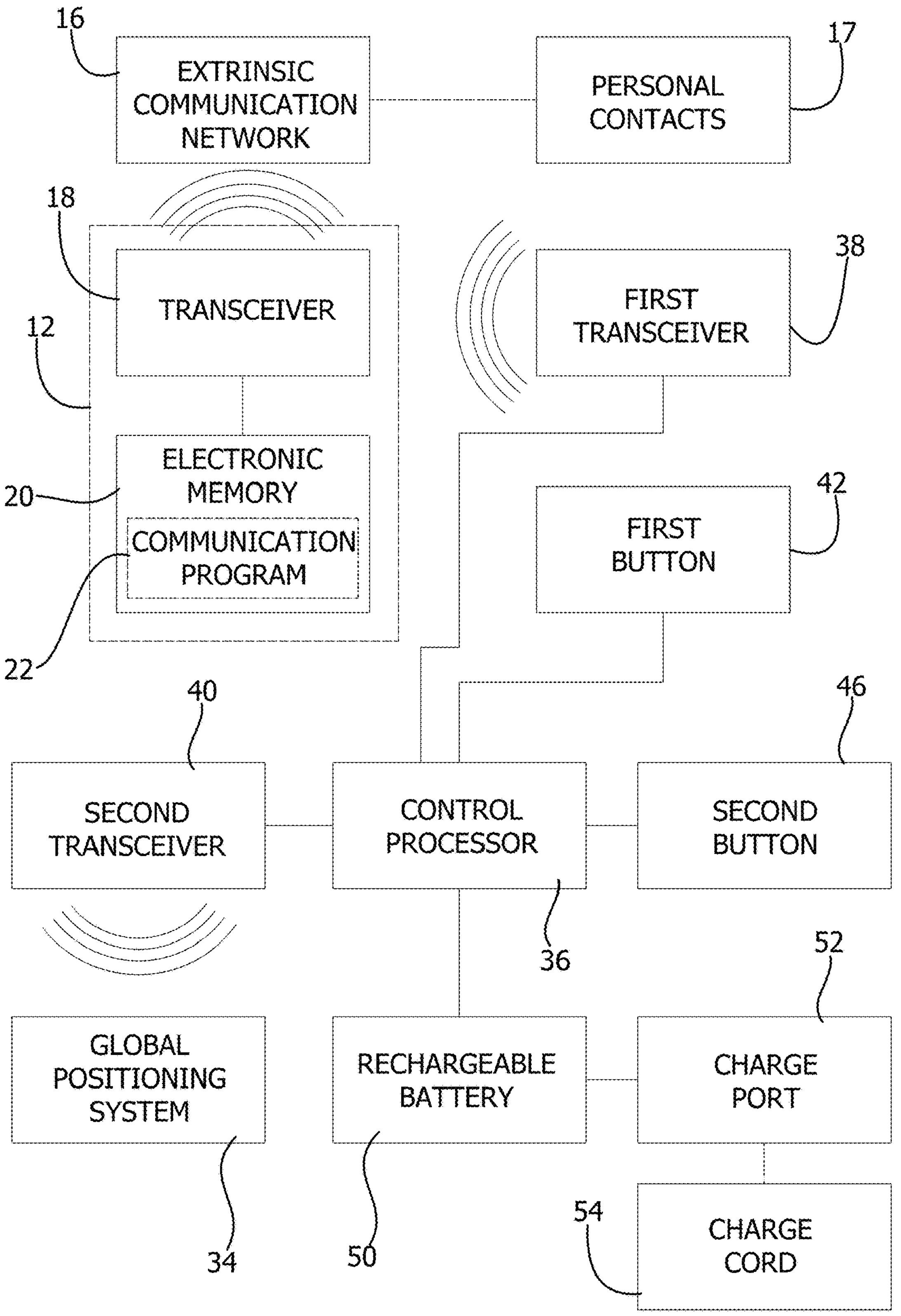
FIG. 5 is a schematic view of an embodiment of the disclosure.

With reference now to the drawings, and in particular to FIGS. 1 through 5 thereof, a new tracking and alert devices embodying the principles and concepts of an embodiment of the disclosure and generally designated by the reference numeral 10 will be described.

As best illustrated in FIGS. 1 through 5, the personal tracking and alert device 10 generally comprises a personal electronic device 12 that is carried by a user 14. The personal electronic device 12 is in wireless communication with an extrinsic communication network 16 to enable the personal electronic device 12 to be in wireless communication with personal contacts 17 of the user 14. The personal electronic device 12 includes a transceiver 18 which is in wireless communication with the extrinsic communication network 16 and the personal electronic device 12 includes an electronic memory 20 which stores a database comprising a communication program 22 that automatically contacts selected personal contacts 17 of the user 14 via the extrinsic communication network 16 when the communication program 22 receives a communication command. The personal electronic device 12 may comprise a smart phone or other type of similar electronic device and the extrinsic communication network 16 may comprise a cellular phone network, the internet or other type of wireless communication network. Furthermore, the transceiver 18 may comprise a radio frequency transceiver or the like and the transceiver 18 may employ a WPAN signal or the transceiver 18 may employ cellular phone communication protocols.

A waist belt 26 is provided that can be worn around a waist 27 of the user 14 and the waist belt 26 has a buckle 28 which is attached to the waist belt 26. A free end 30 of the waist belt 26 can be releasably mated to the buckle 28 thereby enabling the waist belt 26 to form a closed loop for retaining the waist belt 26 around the waist 27 of the user 14. The waist belt 26 may be comprised of leather, canvas, nylon or any other type of material that is commonly employed in the clothing industry. Additionally, the buckle 28 may be any type of releasable buckle that is commonly employed in the clothing industry for waist belts.

A communication unit 32 is integrated into the waist belt 26 and the communication unit 32 is in wireless communication with the personal electronic device 12. The communication unit 32 is actuatable into a first condition thereby enabling the communication unit 32 to broadcast a help command to the personal electronic device 12 such that the personal electronic device 12 contacts the personal contacts 17 of the user 14. In this way the communication unit 32 can alert the personal contacts 17 of the user 14 that the user 14 is in need of assistance. The communication unit 32 is actuatable into a second condition thereby enabling the communication unit 32 to be in wireless communication with a global positioning system 34 for tracking a physical location of the waist belt 26. Furthermore, the communication unit 32 broadcasts the physical location of the waist belt 26 to the personal electronic device 12 to enable the personal electronic device 12 to communicate the physical location of the waist belt 26 to the personal contacts 17 of the user 14. In this way the communication unit 32 enables the personal contacts 17 of the user 14 to track the physical location of the waist belt 26 to locate the user 14.

The communication unit 32 comprises a control processor 36 which is integrated into the waist belt 26 and the control processor 36 receives a first input and a second input. The communication unit 32 includes a first transceiver 38 which is integrated into the waist belt 26 and the first transceiver 38 is electrically coupled to the control processor 36. Furthermore, the first transceiver 38 is in wireless communication with the transceiver 18 in the personal electronic device 12. The first transceiver 38 is actuated to broadcast the communication command to the transceiver 18 in the personal electronic device 12 when the control processor 36 receives the first input. In this way the communication program 22 stored in the electronic memory 20 in the personal electronic device 12 is enabled to automatically contact the selected personal contacts 17 of the user 14. The first transceiver 38 may comprise a radio frequency transceiver 18 or the like and the first transceiver 38 may employ Bluetooth communication protocols.

The communication unit 32 includes a second transceiver 40 which is integrated into the waist belt 26 and the second transceiver 40 is electrically coupled to the control processor 36. The second transceiver 40 is in wireless communication with the global positioning system 34 and the second transceiver 40 is actuated to receive the physical location of the waist belt 26 from the global positioning system 34 when the control processor 36 receives the second input. Furthermore, the first transceiver 38 broadcasts the physical location of the waist belt 26 to the transceiver 18 in the personal electronic device 12 when the second transceiver 40 is actuated to receive the physical location of the waist belt 26 from the global positioning system 34. In this way the personal electronic device 12 is enabled to communicate the physical location of the waist belt 26 to the personal contacts 17 of the user 14. The second transceiver 40 may comprise a radio frequency transceiver or the like and the second transceiver 40 may employ communication protocols that are common to global positioning systems.

The communication unit 32 includes a first button 42 which is movably integrated a rear surface 44 of the waist belt 26. In this way the first button 42 is accessible to the user 14 when the user 14 is wearing the waist belt 26 while being concealed from an observer. The first button 42 is electrically coupled to the control processor 36 and the control processor 36 receives the first input when the first button 42 is depressed. The communication unit 32 includes a second button 46 which is movably integrated the rear surface 44 of the waist belt 26. In this way the second button 46 is accessible to the user 14 when the user 14 is wearing the waist belt 26 while being concealed from the observer. Additionally, the second button 46 is electrically coupled to the control processor 36 and the control processor 36 receives the second input when the second button 46 is depressed.

The communication unit 32 includes a power supply 48 which is integrated into the waist belt 26 and the power supply 48 is electrically coupled to the control processor 36. The power supply 48 comprises a rechargeable battery 50 which is integrated into the waist belt 26 and the rechargeable battery 50 is electrically coupled to the control processor 36. The power supply 48 includes a charge port 52 which is integrated into the waist belt 26 thereby enabling the charge port 52 to insertably receive a charge cord 54. Additionally, the charge port 52 is electrically coupled to the rechargeable battery 50 for charging the rechargeable battery 50 when the charge cord 54 is plugged into the charge port 52. The charge port 52 may comprise a universal serial bus port or other type of charge port that is common to rechargeable electronic devices. As is most clearly shown in FIG. 1, the rear surface 44 of the waist belt 26 may have a cut 56 which facilitates access to an interior of the waist belt 26 to enable the rechargeable battery 50 to removed or installed through the cut 56.

In use, the user 14 wears the waist belt 26 in the convention of clothing fashion and the first transceiver 38 is synchronized with the transceiver 18 in the personal electronic device 12 in the convention of Bluetooth communication. The user 14 can depress the first button 42 when the user 14 feels as though they are in a potentially dangerous situation, such as potentially being attacked by an assailant. In this way the communication program 22 stored in the electronic memory 20 of the personal electronic device 12 automatically contacts the selected personal contacts 17 of the user 14 to notify the personal contacts 17 that the user 14 needs assistance. Additionally, the user 14 can depress the second button 46 to enable the personal electronic device 12 to broadcast the physical location of the waist belt 26 to the personal contacts 17 of the user 14. In this way the personal contacts 17 can track the location of the user 14 to notify law enforcement, for example, that the user 14 needs assistance and has potentially been abducted.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A personal tracking and alert device for discretely alerting personal contacts that a user is experiencing an emergency and/or providing a global positioning system location marker to track the user, said device comprising:

a personal electronic device being configured to be carried by a user, said personal electronic device being in wireless communication with an extrinsic communication network wherein said personal electronic device is configured to be in wireless communication with personal contacts of the user;

a waist belt being configured to be worn around a waist of the user, said waist belt having a buckle being attached to said waist belt, a free end of said waist belt being releasably matable to said buckle thereby enabling said waist belt to form a closed loop wherein said waist belt is configured to be retained around the waist of the user; and a communication unit being integrated into said waist belt, said communication unit being in wireless communication with said personal electronic device, said communication unit being actuatable into a first condition thereby enabling said communication unit to broadcast a help command to said personal electronic device such that said personal electronic device contacts the personal contacts of the user wherein said communication unit is configured to alert the personal contacts of the user that the user is in need of assistance, said communication unit being actuatable into a second condition thereby enabling said communication unit to be in wireless communication with a global positioning system for tracking a physical location of said waist belt, said communication unit broadcasting said physical location of said waist belt to said personal electronic device to enable said personal electronic device to communicate said physical location of said waist belt to the personal contacts of the user wherein said communication unit is configured to enable the personal contacts of the user to track said physical location of said waist belt to locate the user.

2. The device according to claim 1, wherein:

said personal electronic device includes a transceiver being in wireless communication with said extrinsic communication network;

said personal electronic device includes an electronic memory storing a database comprising a communication program which automatically contacts selected personal contacts of the user via said extrinsic communication network when said communication program receives a communication command;

said communication unit comprises a control processor being integrated into said waist belt;

said control processor receiving a first input;

said communication unit comprises a first transceiver being integrated into said waist belt;

said first transceiver is electrically coupled to said control processor;

said first transceiver is in wireless communication with said transceiver in said personal electronic device; and said first transceiver is actuated to broadcast said communication command to said transceiver in said personal electronic device when said control processor receives said first input thereby enabling said communication program stored in said electronic memory in said personal electronic device to automatically contact the selected personal contacts of the user.

3. The device according to claim 1, wherein said personal electronic device includes a transceiver being in wireless communication with said extrinsic communication network;

said communication unit comprises a control processor being integrated into said waist belt;

said control processor receives a first input and a second input;

said communication unit includes a first transceiver being in wireless communication with said transceiver in said personal electronic device;

said communication unit includes a second transceiver being integrated into said waist belt;

said second transceiver is electrically coupled to said control processor;

said second transceiver is in wireless communication with said global positioning system;

said second transceiver is actuated to receive said physical location of said waist belt from said global positioning system when said control processor receives said second input; and said first transceiver broadcasts said physical location of said waist belt to said transceiver in said personal electronic device when said second transceiver is actuated to receive said physical location of said waist belt from said global positioning system thereby enabling said personal electronic device to communicate said physical location of said waist belt to the personal contacts of the user.

4. The device according to claim 2, wherein:

said communication unit includes a first button being movably integrated a rear surface of said waist belt wherein said first button is configured to be accessible to the user when the user is wearing said waist belt while being concealed from an observer;

said first button is electrically coupled to said control processor; and said control processor receives said first input when said first button is depressed.

5. The device according to claim 3, wherein:

said communication unit includes a first button;

said communication unit includes a second button being movably integrated a rear surface of said waist belt wherein said second button is configured to be accessible to the user when the user is wearing said waist belt while being concealed from the observer;

said second button is electrically coupled to said control processor; and said control processor receives said second input when said second button is depressed.

6. The device according to claim 1, wherein:

said communication unit includes a control processor:

said communication unit includes a power supply being integrated into said waist belt, said power supply being electrically coupled to said control processor, said power supply comprises:

a rechargeable battery being integrated into said waist belt, said rechargeable battery being electrically coupled to said control processor; and a charge port being integrated into said waist belt thereby enabling said charge port to insertably receive a charge cord, said charge port being electrically coupled to said rechargeable battery for charging said rechargeable battery when said charge cord is plugged into said charge port.

7. A personal tracking and alert device for discretely alerting personal contacts that a user is experiencing an emergency and/or providing a global positioning system location marker to track the user, said device comprising:

a personal electronic device being configured to be carried by a user, said personal electronic device being in wireless communication with an extrinsic communication network wherein said personal electronic device is configured to be in wireless communication with personal contacts of the user, said personal electronic device including a transceiver being in wireless communication with said extrinsic communication network, said personal electronic device including an electronic memory storing a database comprising a communication program which automatically contacts selected personal contacts of the user via said extrinsic communication network when said communication program receives a communication command;

a waist belt being configured to be worn around a waist of the user, said waist belt having a buckle being attached to said waist belt, a free end of said waist belt being releasably matable to said buckle thereby enabling said waist belt to form a closed loop wherein said waist belt is configured to be retained around the waist of the user;

a communication unit being integrated into said waist belt, said communication unit being in wireless communication with said personal electronic device, said communication unit being actuatable into a first condition thereby enabling said communication unit to broadcast a help command to said personal electronic device such that said personal electronic device contacts the personal contacts of the user wherein said communication unit is configured to alert the personal contacts of the user that the user is in need of assistance, said communication unit being actuatable into a second condition thereby enabling said communication unit to be in wireless communication with a global positioning system for tracking a physical location of said waist belt, said communication unit broadcasting said physical location of said waist belt to said personal electronic device to enable said personal electronic device to communicate said physical location of said waist belt to the personal contacts of the user wherein said communication unit is configured to enable the personal contacts of the user to track said physical location of said waist belt to locate the user, said communication unit comprising:

a control processor being integrated into said waist belt, said control processor receiving a first input and a second input;

a first transceiver being integrated into said waist belt, said first transceiver being electrically coupled to said control processor, said first transceiver being in wireless communication with said transceiver in said personal electronic device, said first transceiver being actuated to broadcast said communication command to said transceiver in said personal electronic device when said control processor receives said first input thereby enabling said communication program stored in said electronic memory in said personal electronic device to automatically contact the selected personal contacts of the user;

a second transceiver being integrated into said waist belt, said second transceiver being electrically coupled to said control processor, said second transceiver being in wireless communication with said global positioning system, said second transceiver being actuated to receive said physical location of said waist belt from said global positioning system when said control processor receives said second input, said first transceiver broadcasting said physical location of said waist belt to said transceiver in said personal electronic device when said second transceiver is actuated to receive said physical location of said waist belt from said global positioning system thereby enabling said personal electronic device to communicate said physical location of said waist belt to the personal contacts of the user;

a first button being movably integrated a rear surface of said waist belt wherein said first button is configured to be accessible to the user when the user is wearing said waist belt while being concealed from an observer, said first button being electrically coupled to said control processor, said control processor receiving said first input when said first button is depressed;

a second button being movably integrated said rear surface of said waist belt wherein said second button is configured to be accessible to the user when the user is wearing said waist belt while being concealed from the observer, said second button being electrically coupled to said control processor, said control processor receiving said second input when said second button is depressed; and a power supply being integrated into said waist belt, said power supply being electrically coupled to said control processor, said power supply comprising:

a rechargeable battery being integrated into said waist belt, said rechargeable battery being electrically coupled to said control processor; and a charge port being integrated into said waist belt thereby enabling said charge port to insertably receive a charge cord, said charge port being electrically coupled to said rechargeable battery for charging said rechargeable battery when said charge cord is plugged into said charge port.

* * * * *